US009442771B2

(12) United States Patent
Morgan

(10) Patent No.: US 9,442,771 B2
(45) Date of Patent: Sep. 13, 2016

(54) GENERATING CONFIGURABLE SUBSCRIPTION PARAMETERS

(75) Inventor: Christopher Edwin Morgan, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 859 days.

(21) Appl. No.: 12/954,378

(22) Filed: Nov. 24, 2010

(65) Prior Publication Data

US 2012/0131594 A1     May 24, 2012

(51) Int. Cl.
    *G06F 15/173*     (2006.01)
    *G06F 9/50*     (2006.01)
    *G06Q 10/06*     (2012.01)
    *G06F 3/06*     (2006.01)

(52) U.S. Cl.
    CPC ........... *G06F 9/5072* (2013.01); *G06F 3/0647* (2013.01); *G06Q 10/06* (2013.01)

(58) Field of Classification Search
    CPC .... G06F 9/46; G06F 3/0647; G06F 2209/50; G06Q 10/06
    USPC ....................................................... 709/226
    See application file for complete search history.

(56) References Cited

U.S. PATENT DOCUMENTS

| | | | |
|---|---|---|---|
| 6,021,402 A * | 2/2000 | Takriti | G06Q 10/06 700/28 |
| 6,463,457 B1 | 10/2002 | Armentrout et al. | |
| 6,988,087 B2 * | 1/2006 | Kanai | G06Q 50/188 705/80 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,104,041 B2 * | 1/2012 | Belady | G06F 11/3409 709/226 |
| 8,214,461 B1 * | 7/2012 | Graupner | G06F 9/5011 707/755 |
| 8,413,155 B2 * | 4/2013 | Jackson | G06F 9/505 718/104 |
| 8,464,255 B2 | 6/2013 | Nathuji et al. | |
| 8,560,677 B2 * | 10/2013 | VanGilder | G06F 1/206 700/300 |
| 2001/0039497 A1 | 11/2001 | Hubbard | |
| 2002/0069276 A1 | 6/2002 | Hino et al. | |
| 2002/0120744 A1 * | 8/2002 | Chellis | G06F 9/50 709/226 |
| 2002/0165819 A1 | 11/2002 | McKnight et al. | |
| 2003/0037258 A1 | 2/2003 | Koren | |
| 2003/0105810 A1 | 6/2003 | McCrory et al. | |

(Continued)

OTHER PUBLICATIONS

"rBuilder and the rPath Appliance Platform", 2007 rPath, Inc., www.rpath.com, 3 pgs.

(Continued)

*Primary Examiner* — Joshua Joo
*Assistant Examiner* — Youndes Naji
(74) *Attorney, Agent, or Firm* — Lowenstein Sandler LLP

(57) ABSTRACT

Implementations relate to accessing a set of usage history data associated with a user account operating a workload on a set of virtual machines in a default deployment, generating, by a hardware processor, a predictive workload associated with the user account in view of the set of usage history data associated with the user account, responsive to generating the predictive workload, identifying a set of available resources in a set of host clouds of virtual machines provided by a cloud provider over the first period of time, accessing a set of deployment criteria received from the cloud provider, and generating a set of subscription parameters in view of the predictive workload, the set of available resources, and the set of deployment criteria to migrate the predictive workload to the set of host clouds of virtual machines.

21 Claims, 7 Drawing Sheets

(56) References Cited

U.S. PATENT DOCUMENTS

| | | |
|---|---|---|
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0283784 A1* | 12/2005 | Suzuki .................. G06F 9/5044 718/100 |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0070771 A1 | 3/2009 | Yuyitung et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0004965 A1* | 1/2010 | Eisen .................. G06Q 10/00 705/318 |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0211669 A1* | 8/2010 | Dalgas .................. G06F 9/5027 709/224 |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0099403 A1 | 4/2011 | Miyata et al. |
| 2011/0131335 A1 | 6/2011 | Spaltro et al. |
| 2011/0138384 A1 | 6/2011 | Bozek et al. |
| 2011/0145392 A1 | 6/2011 | Dawson et al. |
| 2011/0167469 A1 | 7/2011 | Letca et al. |
| 2011/0213508 A1 | 9/2011 | Mandagere et al. |
| 2011/0239010 A1 | 9/2011 | Jain et al. |
| 2011/0289329 A1* | 11/2011 | Bose ........................ G06F 1/329 713/320 |
| 2011/0302078 A1* | 12/2011 | Failing ..................... B60L 3/00 705/39 |
| 2012/0023223 A1* | 1/2012 | Branch .................. G06F 9/4856 709/224 |
| 2012/0054345 A1 | 3/2012 | Sahu et al. |
| 2012/0254640 A1* | 10/2012 | Agarwala ............. G06F 3/0625 713/320 |
| 2012/0296852 A1* | 11/2012 | Gmach .................. G06Q 10/06 705/400 |
| 2012/0310765 A1* | 12/2012 | Masters ................ G06F 9/5094 705/26.3 |
| 2013/0159596 A1* | 6/2013 | Van De Ven ......... G06F 12/109 711/6 |

OTHER PUBLICATIONS

White Paper—"rPath Versu Other Software Appliance Approaches", Mar. 2008, rPath, Inc., www.rpath.com, 9 pgs.

White Paper—"rBest Practices for Building Virtual Appliances", 2008 rPath, Inc., www.rpath.com, 6 pgs.

DeHean et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

(56) References Cited

OTHER PUBLICATIONS

Ferris et al, "Systems and Methods for Managing a Software Subscription in a Cloud Network", U.S. Appl. No. 12/714,096, flied Feb. 26, 2010.
Ferris at al., "Methods and Systems for Providing Deployment Architectures in Cloud Computing Enviornments", U.S. Appl. No. 12/714,427, filed Feb. 26, 2010.
Ferris et al., "Methods and Systems for Matching Resource Requests with Cloud Computing Environments", US. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris at al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Network", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud" U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.

Ferris et al., "System and Methods for Migrating Subscribed Services in a Cloud Deployment", U.S. Appl. No. 12/956,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan "Systems and Methods for Generating Multi-Cloud incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Managing Subscribed Resource Limits in Cloud Network Using Variable or instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al. "Systems and Methods for Reclassifying Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combines Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud installation Information Using Cloud-Aware Kernal of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System lnstallation in Cloud-Based Network", U.S. Appl. No. 13/149,877, filed May 31, 2011.
USPTO Non-Final Office Action, U.S. Appl. No. 12/957,274 mailed Sep. 13, 2012.
USPTO Final Office Action, U.S. Appl. No. 12/957,274, mailed Feb. 11, 2013.
USPTO Advisory Action, U.S. Appl. No. 12/957,274, mailed Dec. 15, 2014.
USPTO Final Office Action, U.S. Appl. No. 12/957,274 mailed Mar. 22, 2016.
USPTO Non Final Office Action, U.S. Appl. No. 12/957,274 mailed Apr. 20, 2015.
USPTO Final Office Action, U.S. Appl. No. 12/957,274 mailed Nov. 4, 2015.

* cited by examiner

FIG. 4

152 — SET OF TIME PERIODS

HOST CLOUD C

| | LOCATION: CENTRAL EUROPE | LOCATION: AUSTRALIA | | |
|---|---|---|---|---|
| | DAILY PERIOD 1 12:00 AM - 8:00 AM EST | DAILY PERIOD 1 12:00 AM - 8:00 AM EST | DAILY PERIOD 2 8:00 AM - 4:00 PM EST | DAILY PERIOD 3 12:00 AM - 4:00 PM EST |
| RESOURCE 1 - PROCESSOR | | AVAILABLE: 15% OF 25000 MIPS | AVAILABLE: 30% OF 25000 MIPS | AVAILABLE: 8% OF 25000 MIPS |
| RESOURCE 2 - MEMORY | | NOT AVAILABLE | AVAILABLE: 15% OF 600 GB | AVAILABLE: 90% OF 600 GB |
| RESOURCE 3 - STORAGE | | AVAILABLE: 10% OF 1500 TB | AVAILABLE: 40% OF 1500 TB | AVAILABLE: 80% OF 1500 TB |
| ... | | | | |
| RESOURCE M | | NOT AVAILABLE | AVAILABLE: M% | AVAILABLE: P% |

HOST CLOUD B — 152

HOST CLOUD A

| | LOCATION: U.S. WEST COAST | | |
|---|---|---|---|
| | DAILY PERIOD 1 12:00 AM - 8:00 AM EST | DAILY PERIOD 2 8:00 AM - 4:00 PM EST | DAILY PERIOD 3 4:00 PM - 12:00 AM EST |
| RESOURCE 1 - PROCESSOR | AVAILABLE: 98% OF 10000 MIPS | AVAILABLE: 60% OF 10000 MIPS | AVAILABLE: 10% OF 10000 MIPS |
| RESOURCE 2 - MEMORY | AVAILABLE: 95% OF 400 GB | AVAILABLE: 70% OF 400 GB | NOT AVAILABLE |
| RESOURCE 3 - STORAGE | AVAILABLE: 80% OF 2000 TB | AVAILABLE: 50% OF 2000 TB | NOT AVAILABLE |
| ... | | | |
| RESOURCE X | AVAILABLE: Z% | AVAILABLE: Y% | NOT AVAILABLE |

172 — HOST RESOURCE MATRIX

GENERATING CONFIGURABLE SUBSCRIPTION PARAMETERS

FIELD

The invention relates generally to systems and methods for generating dynamically configurable subscription parameters for the temporary migration of predictive user workloads in a cloud network, and more particularly, to platforms and techniques for tracking a cloud operator's available overnight or other off-peak resources, and permitting the operator to selectively configure subscription terms to offer to one or more users to allow the user's workloads to be shifted to those underutilized cloud networks on a temporary or other short-term basis.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the management of user workloads in a twenty-four hour cloud environment, some cloud providers who operate or have access to cloud-based networks hosted in diverse geographic regions may wish to provide their users with access to processing, memory, application, and/or other resources under advantageous terms during overnight or other off-peak time periods, on a temporary basis. That is, cloud providers who maintain cloud-based networks in a separate geographic areas, such as the East coast of the U.S. and West coast of the U.S., may experience different utilization rates of their hosted resources at different times of day, due to business hours, daylight and evening hours, and/or other patterns or schedules. In periods of reduced cloud utilization, the cloud provider may discover that underutilized resources are available during overnight or other off-peak times, creating an opportunity to offer various temporary migration pathways to their users for their ongoing workloads.

In terms of potential re-hosting or re-seating of those workloads, existing cloud management platforms or other deployment tools do not afford a cloud operator to access and review their off-peak available resources, compare those available resources to the historical usage data of their corporate or other users or customers, and selectively configure subscription terms for possible temporary hosting of those workloads in geographically remote or dispersed clouds. In cases, the cloud provider may wish to place partial or full cloud support for a user's workload at a reduced off-peak or temporary subscription rate. In cases, the cloud provider may in addition or instead wish to offer different combinations of resources and/or service level agreements (SLAs) for various resources or services, such as to upgrade or downgrade processor, bandwidth, and/or other commitments to the user, at times that may be advantageous for the user, the cloud provider, or both.

It may accordingly be desirable to provide systems and methods for generating dynamically configurable subscription parameters for the temporary migration of predictive user workloads in a cloud network, in which a centralized deployment tool is configured to access the usage history for a subscriber or customer of a cloud provider, and assist in generating selective or dynamically generated subscription parameters to create temporary or short-term workload migrations to alternative host clouds based in dispersed or separated geographic areas and/or corresponding time zones.

DESCRIPTION OF DRAWINGS

FIG. 4 illustrates an exemplary data structure in which the available off-peak resources of a set of geographically dispersed host clouds can be recorded, according to various aspects;

DESCRIPTION

Figure 1:
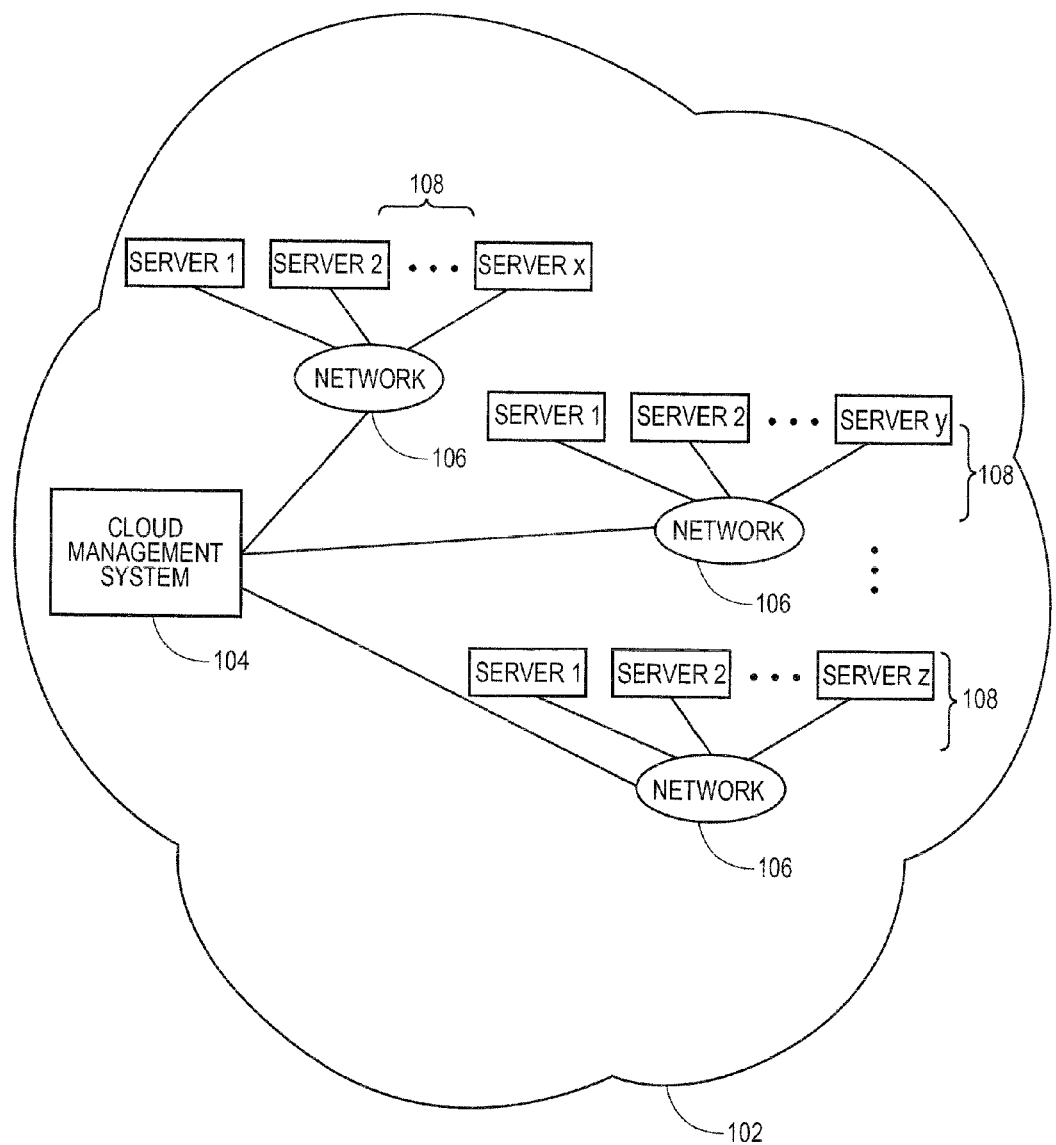
FIG. 1 illustrates an overall cloud system architecture in which various aspects of systems and methods for generating dynamically configurable subscription parameters for the temporary migration of predictive user workloads in a cloud network can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports, bandwidth, pipes, or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 10R to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
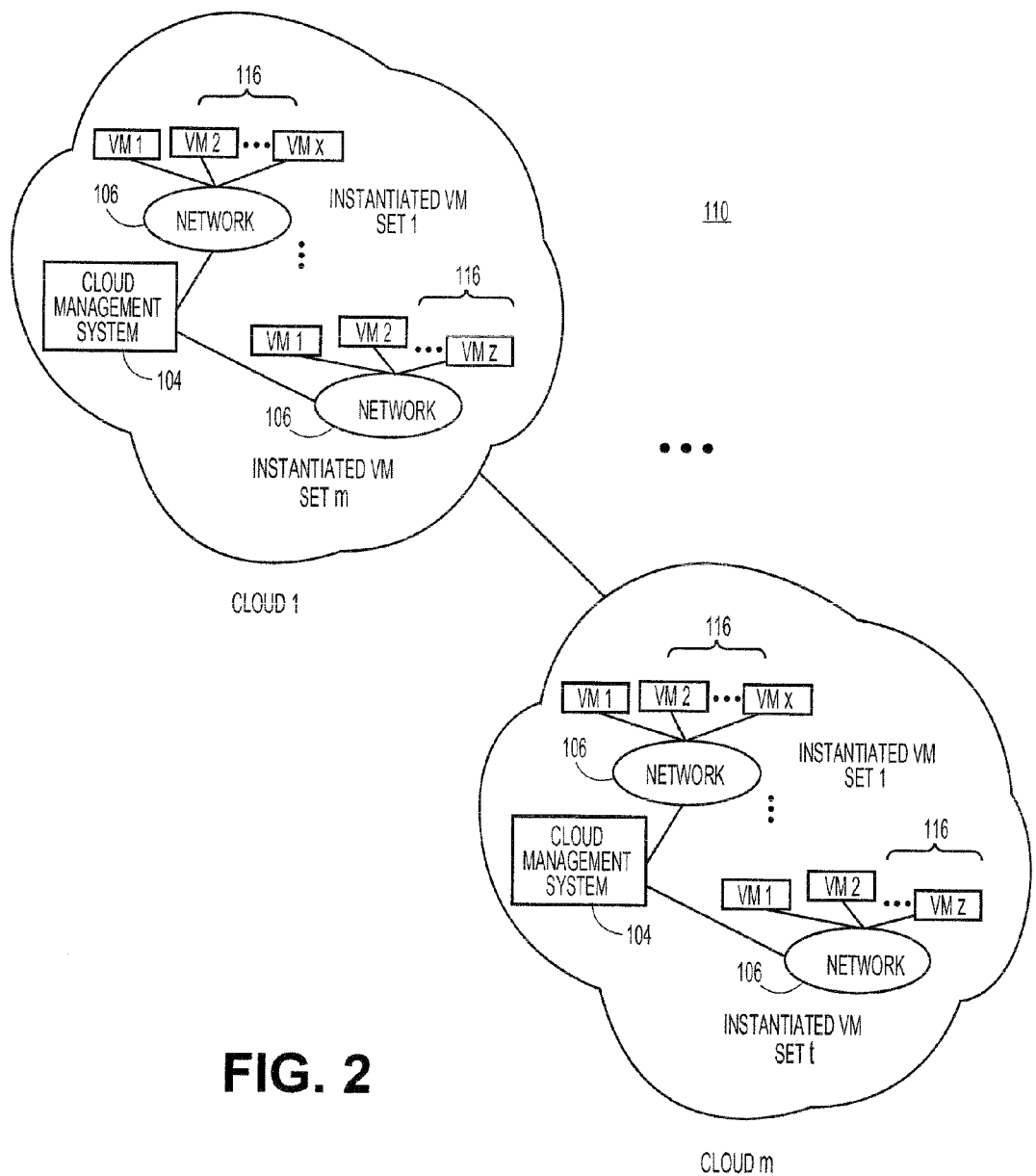
FIG. 2 illustrates an overall cloud system architecture in which various aspects of systems and methods for generating dynamically configurable subscription parameters for the temporary migration of predictive user workloads in a cloud network can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3A:
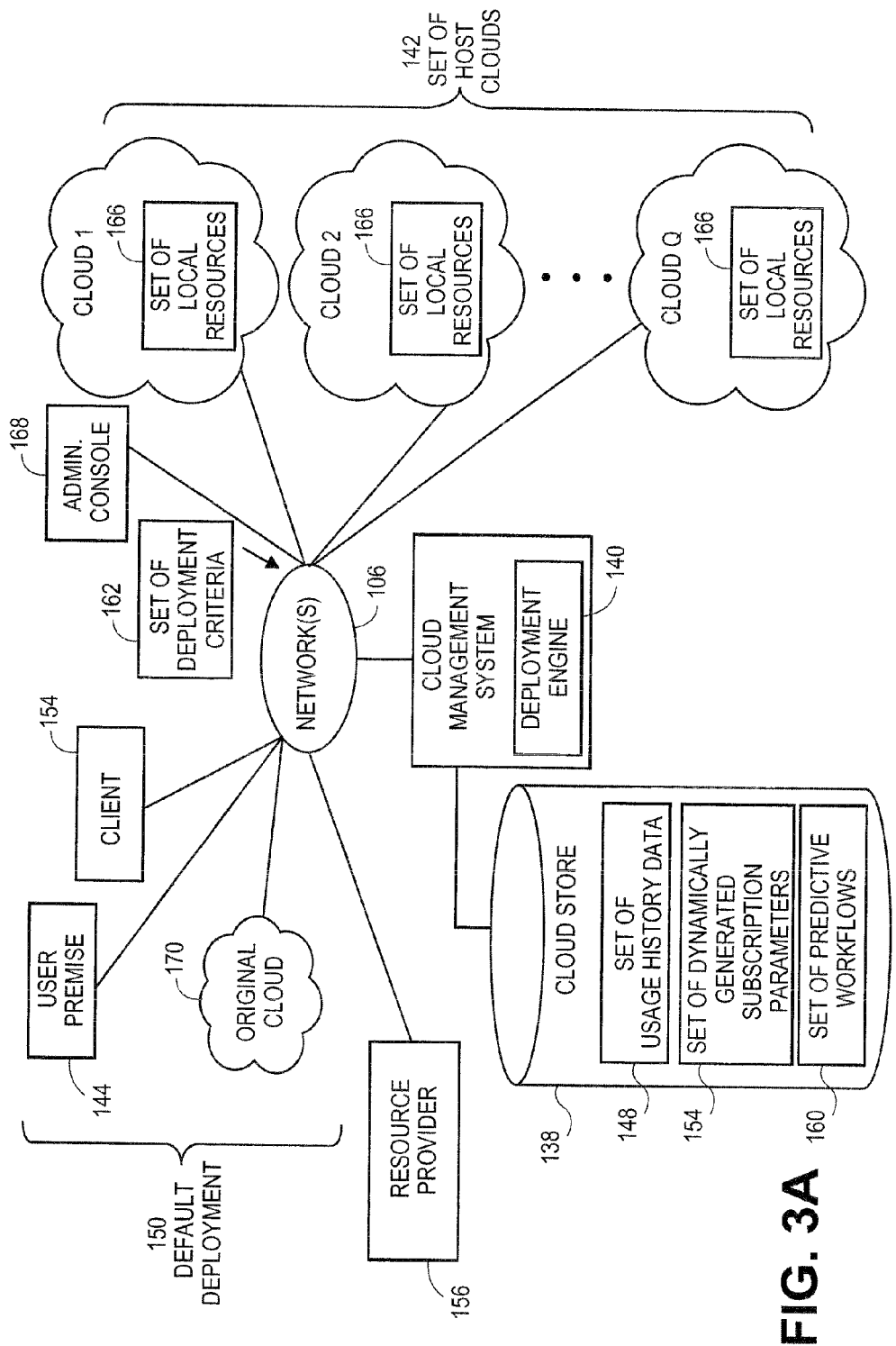
FIGS. 3A and 3B illustrate various network configurations in which systems and methods for generating dynamically configurable subscription parameters for the temporary migration of predictive user workloads in a cloud network can be practiced, including the potential distribution of user workloads to geographically separated areas, according to various embodiments.

Aspects of the present teachings relate to platforms and techniques in which a centralized or distributed deployment engine and/or other logic can track and manage the migration of user workloads to underutilized clouds in different geographic zones, and/or to host clouds which are under-utilized or available for other reasons. FIG. 3A shows an illustrative network configuration in which systems and methods for generating dynamically configurable subscription parameters for the temporary migration of predictive user workloads in a cloud network can be implemented, according to various embodiments. In embodiments as shown, the operator or provider of a set of host clouds 142 can track, deploy, and manage user workloads that are subscribed to the set of host clouds 142, including a set of local resources 166 such as processor, memory, storage, communications, operating system, application, and/or other resources based, located, and/or hosted in the respective clouds of the set of host clouds 142. It may be noted that in various aspects, a workload can consist of a set of executed or executing processing, computation, storage, communication, and/or other other tasks carried out under control of a programmed, automatic, and/or other work flow or flows. In aspects as shown, the operator or provider of the set of host clouds 142 can access an administrative console 168, such as a desktop computer or workstation, to monitor and manage the set of host clouds 142 and user deployments to the set of host clouds 142. In aspects, the provider or operator of the set of host clouds 142 can use the administrative console 168 and/or other access sites, ports, and/or services to access and/or initiate a deployment engine 140 hosted in cloud management system 104 for the set of host clouds 142 to initiate and manage the scheduling and configuration of off-peak and/or other temporary or short-term deployments of a user's workloads to the set of host clouds 142.

In aspects as shown, the subject user or users can operate a default deployment 150, illustrative shown as comprising a user premise, such as a corporate or other local area network (LAN) including servers, clients, and storage resources, as well as at least one original cloud 170, which can comprise a cloud-based network in which a user maintains a comparatively long-term subscription, such as for virtual machine, software and/or other resources. The default deployment 150 for the user can comprise other types, combinations, and/or configurations of hardware-based and/or cloud-based networks and resources. In aspects, the user(s) can access and/or manage the default deployment 150 via a client 154, and/or other channel, machine, site, and/or service. In aspects and as also shown in FIG. 3A, one or more resource providers 156 can communicate or interact with the default deployment 150, client 154, administrative console 168, set of host clouds, and/or other locations or resources. The one or more resource providers 156 can include independent software vendors (ISVs), such as operator system and/or application vendors who offer various software entitlements for subscription to users, for instance on a periodic, on-demand, and/or other basis.

In aspects, the deployment engine 140 can access, update, store and track a set of usage history data 148 that reflects the consumption by the user of their subscribed resources in the default deployment of the user, and/or of the set of local resources 166 which the user may temporarily consume when operating workloads in the set of host clouds 142 on an off-peak or temporary basis, as described herein. In aspects, the set of usage history data 148 can reflect daily, weekly, monthly, and/or other recurring patterns in the user's consumption of resources, for instance based on business or commercial patterns or schedules that affect the user's demands for computing resources. Thus for instance, a retail user may have a set of usage history data 148 which reflects a high degree of consumption of processor and communications bandwidth during retail hours, such as 10:00 a.m. to 9:00 p.m., reflecting the operation of a large number of point of sale (POS) terminals while retail outlets are open and transacting business. The set of usage history data 148 for the same user may reflect a lower amount of processor and communications bandwidth consumption after close of scheduled retail hours, followed by an increase in database and/or storage consumption from for instance 12:00 a.m. to 6:00 a.m. as the enterprise applications of that user perform inventory and other adjustments for the following business day. Other increases, decreases, adjustments, and/or other patterns for the consumption of resources can be reflected in the set of usage history data 148. In aspects, the set of usage history data 148 maintained by one provider or operator of the set of host clouds 142 and/or other networks can incorporate resource consumption and workloads from more than one user.

According to regards, the deployment engine 140 and/or other logic can analyze the set of usage history data 148 to develop or generate a set of predictive workloads 160 for a subject user. The set of predictive workloads 160 can reflect an expected set of consumption rates for one or more periods or intervals of time for that user, based on the historical trend or patterns demonstrated in the set of usage history data 148 for those resources. The set of predictive workloads 160 can in regards be generated by taking the average consumption rates for one or more resources over daily, weekly, and/or other intervals, so that, for instance, a retail user as noted may be assigned a set of predictive workloads 160 including a minimum of 30,000 MIPs (millions of instructions per second) per hour of processing throughput for the period of 10:00 a.m. to 9:00 p.m., along with a minimum of 2,000 instances of an operating system, followed by a minimum storage requirement of 300 Terabytes (TB) from 12:00 a.m. to 6:00 a.m. along with 400 instances of a database application. Other time periods, resources, and/or consumption rates can be generated or identified in the set of predictive workloads 160. After generation of the set of predictive workloads 160, the deployment engine 140 can examine the set of local resources 166 available in the set of host clouds 142 over the same time periods, to determine whether any one or more host cloud in the set of host clouds 142 can host or absorb the user's workloads, on an overnight and/or other temporary or short-term basis. In aspects, the provider or operator of the set of host clouds 142 can input or specify and set of deployment criteria 162 indicating or filtering those resources in the set of local resources 166 they may wish to offer or provide to the subject user, in the form of a set of dynamically generated subscription parameters 154 under which the user can temporarily deploy or migrate their workloads to the set of host clouds 142.

Figure 3B:
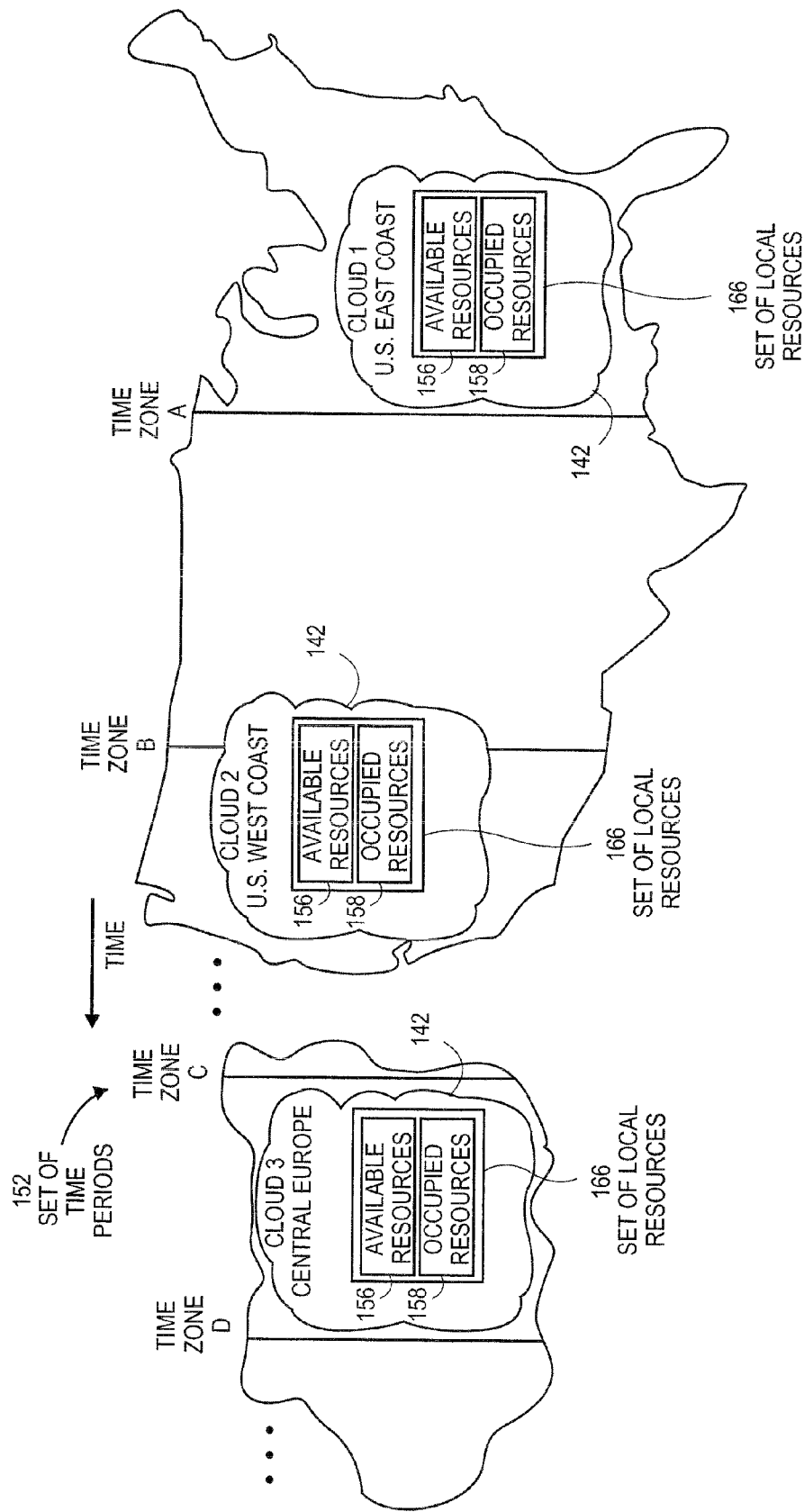

More particularly, and as for instance shown in FIG. 3B, the set of host clouds 142 can in instances be based, located, and/or hosted in a collection of geographically separate or dispersed areas, such as the U.S. East coast, the U.S. West coast, a central Europe site, and/or other locations or areas. In aspects, different cloud-based networks in the set of host clouds 142 can for instance be located in different time zones, such as different or diverse time zones established in the universal coordinated time (UCT) and/or other timekeeping systems. Each geographically dispersed cloud in the set of host clouds 142 can have a different set of local resources 166 which can, for each cloud, comprise a set of available resources 156 and a set of occupied resources 158, reflecting local processor, memory, software, and/or other resources that may be available for subscription and use, or not available for subscription or use due for example to use by other users, maintenance operations, and so forth. In aspects, the deployment engine 140 can examine the set of available resources 156 for the individual clouds in the set of host clouds 142, determine those clouds having set of available resources 156 matching or satisfying the set of predictive workloads 160 for a user, and identify that cloud or clouds as a potential short-term or temporary for the set of predictive workloads 160 over the corresponding overnight or other set of time periods 152. With the candidate host clouds identified, the deployment engine 140 can apply the set of deployment criteria 162 which the provider or operator of the set of host clouds 142 wishes to apply, such as, for instance, "identify those host clouds that permit a subscription to a minimum processor throughput of 40,000 MIPs for at least 30% less than the user's subscription rates in their default deployment." Other criteria can be used. The deployment engine 140 can apply the set of deployment criteria 162 to generate the set of dynamically generated subscription parameters 154 to present or deliver to the user, for possible overnight and/or other time-varying or temporary use. In aspects, the user can configure their subscription with the provider or operator of the set of host clouds 142, and/or with the one or more resource providers 156, to automatically accept the set of dynamically generated subscription parameters 154 for off-peak or other deployment of their workloads. In aspects, the deployment engine 140 can notify the user and wait for user selection or confirmation of acceptance of the set of dynamically generated subscription parameters 154, before moving the user's workloads to the set of host clouds 142 under terms or conditions identified in the set of dynamically generated subscription parameters 154. It may be noted that in regards, the set of dynamically generated subscription parameters 154 can reflect dynamic or time-varying terms, conditions, or criteria, including subscription costs and service level agreements (SLAs), based on changing conditions in the set of host clouds 142, the default deployment 150, and/or other operating conditions or related data. In aspects, the provider or operator of the set of host clouds 142, the one or more resource providers 156, and/or other entities can specify default criteria in the set of deployment criteria 162 to automatically generate the lowest possible subscription costs to the user for temporarily migrating their set of predictive workloads 160, but can also or instead, as noted, specify minimum or maximum resource commitment levels, different resource availability in the set of time periods 152, and/or other criteria, filters, thresholds, constraints, or conditions. In aspects, the set of dynamically generated subscription parameters 154 can accordingly be updated on a regular, irregular, even-triggered and/or other basis, such as every hour, day, week, month, and/or other period. In further aspects, the set of dynamically generated subscription parameters 154 can accordingly specify or offer different subscription costs and/or other conditions for different days of the week, and/or differing or varying in other intervals of the set of time periods 152, depending on changing conditions in the set of host clouds 142 and/or other factors.

In terms of the capture and management of the set of usage history data 148, and the correlation and analysis of the set of local resources 166 hosted in the set of host clouds 142 to potentially host the workloads of a user reflected in the set of usage history data 148, FIG. 4 illustrates data structures and/or encoding that can be used to record the resources available to the cloud provider of set of host clouds 142 to offer or deploy for a subject end-user over different periods of time. In aspects as shown, the deployment engine 140 and/or other logic can capture and store a time-varying host resource matrix 172, in which the set of available resources 156 and the set of occupied resources 158 of the set of host clouds 142 can be reflected for set of time periods 152. In aspects, the set of time periods 152 can comprise a division of the hours of a day into different intervals. In aspects, the different intervals of set of time periods 152 can correspond to different periods in a business day, and/or can reflect different patterns or schedules. In aspects, and as merely illustratively shown, the set of time periods 152 can reflect a division of the times of day into three periods, such as midnight to 8:00 a.m., 8:00 a.m. to 4:00 p.m., and 4:00 p.m. to midnight. Other times, intervals, and/or periods can be used, as well as different numbers of periods. In aspects, the set of time periods 152 can be divided into equal intervals or periods, unequal intervals or periods, and/or combinations of both.

According to aspects, the time-varying host resource matrix 172 can reflect the set of occupied resources 158 of one or more host clouds in the set of host clouds 142 over different intervals or periods in the set of time periods 152. In aspects, resources (such as processor, memory, operating system instances, and/or others) can be recorded as occupied or unavailable due to various events or conditions, such as the reservation of those resources for other users or entities subscribing to them in the applicable time period, the removal of those resources for maintenance or upgrade purposes, and/or other reasons. The set of local resources 166 in the set of host clouds 142 which are unreserved or unused can be recorded in the host resource matrix 172 as part of the set of available resources 156, and therefore available to be offered to the customer(s) or other user(s) of the set of host clouds 142 from the cloud operator of the set of host clouds 142. In aspects, the host resource matrix 172 can be updated on an hourly, daily, and/or other basis or schedule to reflect newly available and/or newly unavailable resources in the set of local resources 166 from which the operator of the set of host clouds 142 wishes to offer to host the set of predictive workloads 160 for the subject user or other entity. In aspects as described herein, the deployment engine 140 and/or other logic can analyze the host resource matrix 172 using the set of deployment criteria, the set of usage history data 148, and/or other data, filters, and/or logic to generate the set of dynamically generated subscription parameters 152 to permit migration or deployment of the set of predictive workloads 160 and/or other user workloads or consumption requirements to the set of host clouds 142, on a geographically staggered and/or otherwise managed basis.

Figure 5:
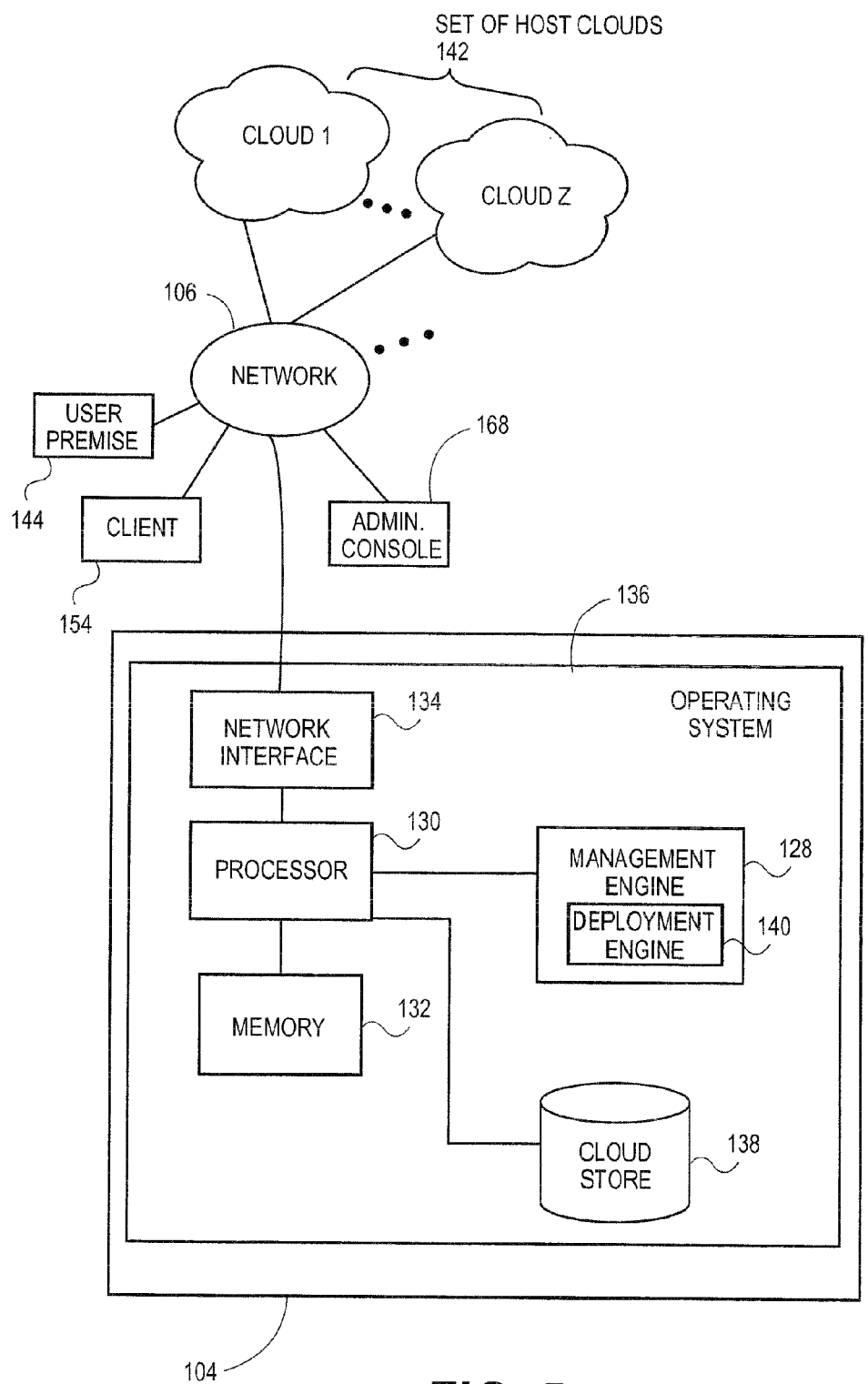
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, deployment engine 140, set of host clouds 142, set of predictive workloads 160, and/or other entities, services, data, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the deployment engine 140, the set of usage history data 148, the user premise 144, the client 154, the set of host clouds 142, the administrative console 168, the set of predictive workloads 160, and/or other interfaces, applications, sites, services, data, and/or logic. Other configurations of the cloud management system 104, associated network connections, and other hardware, software, and service resources are possible. It may be noted that in embodiments, the client 154, the administrative console 168, and/or other hardware machines, platforms, or engines can comprise the same or similar resources as cloud management system 104, or can be configured with different hardware and software resources.

Figure 6:
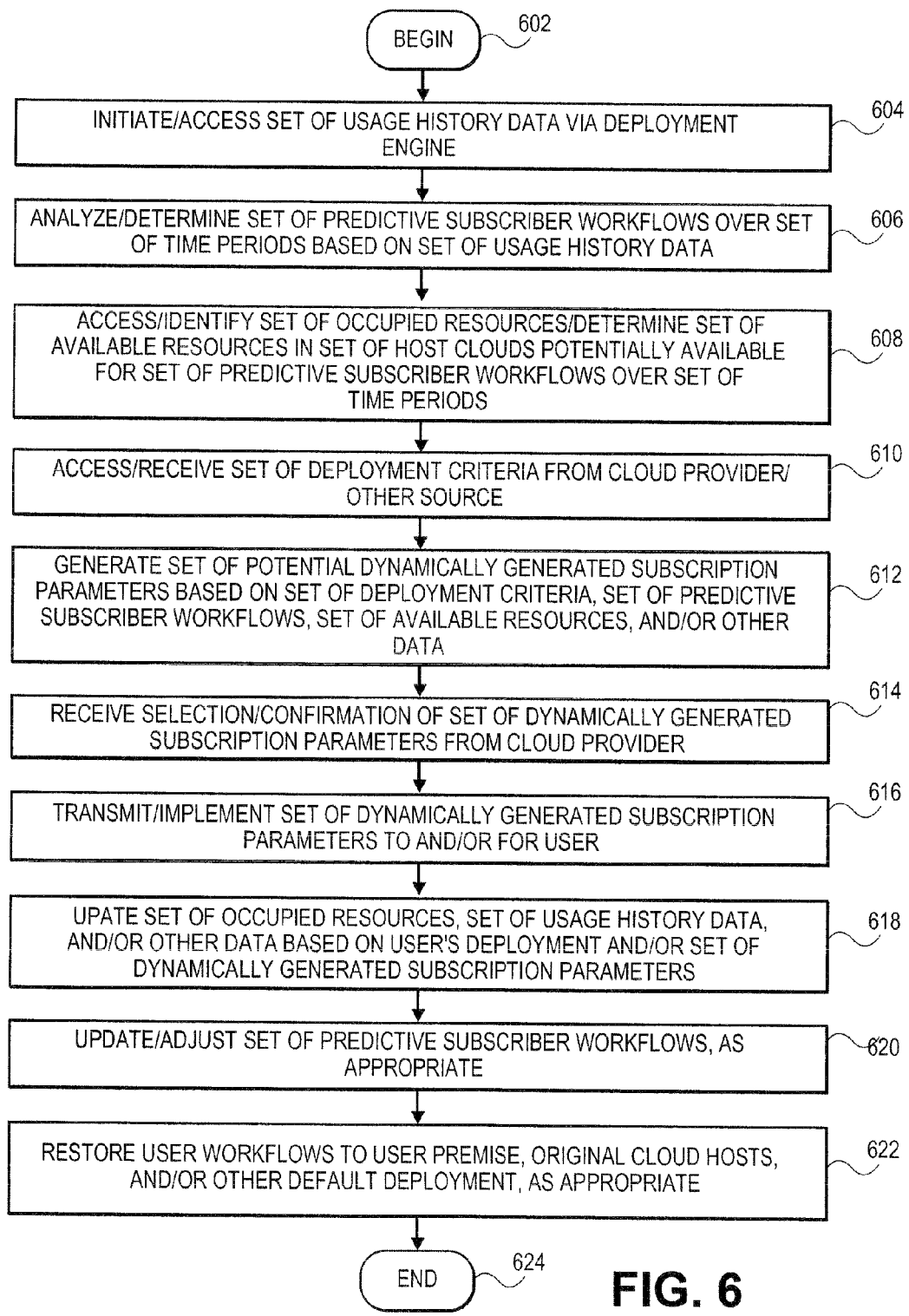
FIG. 6 illustrates a flowchart for the analysis and processing of possible migrations of user workloads including potential temporary placements of those workloads to geographically remote or separated cloud networks, along with configuration options for those short-term subscriptions, in systems and methods for generating dynamically configurable subscription parameters for the temporary migration of predictive user workloads in a cloud network, according to various embodiments.

FIG. 6 illustrates a flowchart of overall processing to perform workload analysis and identify off-peak and/or other temporary deployments for a user under advantageous and/or modified terms, according to various embodiments of the present teachings. In 602, processing can begin. In 604, an administrator and/or other user can initiate and/or access a set of usage history data via deployment engine 140. In aspects, the user can be an administrator of the provider set of host clouds 142, of one or more resource providers 156, of the user whose set of usage history data 148 is being analyzed, and/or other users or entities. In 606, the deployment engine 140 can analyze and/or identify a set of predictive workloads 160 based on the subject user or subscriber's set of usage history data 148 and/or other information. For instance, the deployment engine 140 can determine that if the user, such as a bank and/or other commercial entity, tends to demonstrate the consumption of a relatively high amount of communications bandwidth while operating a set of financial software applications from 8:00 a.m. to 4:00 pm U.S. Eastern time, with relatively low processor and application consumption from 4:00 pm to 10:00 p.m. Eastern time, followed by increased processor and storage consumption from 10:00 p.m. to 2:00 a.m. as a relatively large number of account files or data are processed and reconciled for the next business day. In such illustrative cases, the deployment engine 140 may predict or project heavy processor, memory, and storage consumption for the 10:00 p.m. to 2:00 a.m. period, and/or other intervals or periods in the set of time periods 152 and/or other subscription periods or intervals for that user, with lesser demands for resources over other intervals or periods. In aspects, the set of predictive workloads 160 can be generated and/or identified by taking averages or medians of time periods, resource consumption data, and/or other information contained in the set of usage history data 148. In embodiments, other calculations, computations, and/or decision logic can be used to generate the set of predictive workloads 160.

In 608, the deployment engine 140 and/or other logic can access and/or identify the set of occupied resources 158, and determine a set of available resources 156 located in the set of host clouds 142 for the desired or relevant time periods that correspond to the set of predictive workloads 160 for the subject user. Thus, in aspects the deployment engine 140 and/or other logic can determine or identify those clouds in the set of host clouds 142 which have enough available processing throughput to service the aforementioned illustrative bank user who wishes to perform account reconciliation operations from 10:00 p.m. to 2:00 a.m. each evening, each weekday evening, or at other times or intervals. Resource matching and/or other analysis can be performed for other resources and/or combinations of resources. In 610, the deployment engine 140 and/or other logic can access and/or receive the set of deployment criteria 162 from the provider or operator of the set of host clouds 142, and/or from other sources. In aspects, the set of deployment criteria 162 can comprise a selection, input, and/or other identification of the subscription criteria and/or other filters or factors which the provider of the set of host clouds 142 and/or other user wishes to be satisfied, weighted, maximized, optimized, and/or selected for packaging or presentation to the subject user. For instance, the set of deployment criteria 162 can be or include a specification of cost or cost variables for overnight and/or other temporary deployment to the set of host clouds 142 during a defined set of time periods 152. For instance, the provider of the set of host clouds 142 and/or other entity can specify that they wish to analyze potential costs schedules which will afford the subject user at least a net 15% cost reduction for shifting their workloads and corresponding consumption of cloud resources to the of host clouds 142 on an overnight or other basis. In aspects, the set of deployment criteria 162 can specify other parameters or criteria in addition to and/or instead of subscription or other cost factors, such as for example to specify that they wish to analyze potential cost schedules which will afford the subject user at least a 10% reduction for shifting their workloads to the set of host clouds 142 on an overnight or other basis, while maintaining a service level agreement (SLA) of at least 75% of the service level agreement (SLA) (e.g., for processor, memory, storage, operating system, and/or application instances) provided by the user's default deployment 150. Other criteria or parameters can be used.

In 612, the deployment engine 140 and/or other logic can generate a set of dynamically generated subscription parameters 154 based on the set of deployment criteria 162, the set of predictive workloads 160, the set of available resources 156, and/or other data. In 614, the deployment engine 140 and/or other logic can receive a selection and/or confirmation of one or more of the set of dynamically generated subscription parameters 154 from the provider of the set of host clouds 142, indicating that provider wishes to select, offer, and/or implement those potential subscription terms to the subject user. In 616, the deployment engine 140 and/or other logic or entity, such as the cloud management system 104 and/or the provider of the set of host clouds 142, can transmit the set of dynamically generated subscription parameters 154 to and/or for the subject user to initiate deployment of the user's default deployment 150 and/or related workloads or portions thereof to the set of host clouds 142. In aspects, the deployment can be for one or more defined period in the set of time periods 152, such as from a first period from 6:00 p.m. to 12:00 midnight, a second period from 12:00 midnight to 6:00 a.m., and/or other periods, times, or intervals. In 618, the deployment engine 140 and/or other logic can update the sat of occupied resources 158, the set of usage history data 148, and/or other data based on the user's deployment of their workloads to the set of host clouds 142, on the selected or configured overnight, temporary, and/or other basis.

In 620, the deployment engine 140 and/or other logic can update the set of predictive workloads 160, as appropriate. For instance, the deployment engine 140 and/or other logic can update the set of predictive workloads 160 based on updates to the set of usage history data 148, updates to the user's default deployment, updates from the results of deployment to the set of host clouds 142 on an overnight, temporary, and/or other basis, and/or based on other data or based on other events. In 622, the deployment engine 140 and/or other logic can restore the user's workloads to the user premise 144, the original cloud hosts of that user's workloads, and/or other networks, components or resources of the default deployment 150, as appropriate. In 624, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. For further example, while embodiments have been described in which user workloads can be temporarily deployed to one set of host clouds 142, in aspects, the deployment engine 140 and related resources can track and make available multiple sets of host clouds, for instance in staggered and/or overlapping geographic areas, to the user for their off-peak or other workloads. Other resources described as singular or integrated can in embodiments be plural or distributed, and resources described as multiple or distributed can in embodiments be combined. The scope of the invention is accordingly intended to be limited only by the following claims.

The invention claimed is:

1. A method comprising:
accessing a set of usage history data associated with a user account operating a workload on a set of virtual machines in a default deployment;
generating, by a hardware processor, a predictive workload associated with the user account in view of the set of usage history data associated with the user account, wherein the predictive workload reflects an average of a set of resource consumption rates over a first period of time, the set of resource consumption rates determined from the set of usage history data associated with the user account over a set of resources;
responsive to generating the predictive workload, identifying a set of available resources in a set of host clouds of virtual machines provided by a cloud provider over the first period of time;
accessing a set of deployment criteria received from the cloud provider; and
generating a set of subscription parameters in view of the predictive workload, the set of available resources, and the set of deployment criteria to migrate the predictive workload to the set of host clouds of virtual machines.

2. The method of claim 1, further comprising:
dynamically generating the set of subscription parameters,
wherein the set of host clouds comprises a set of geographically dispersed host clouds.

3. The method of claim 2, wherein the set of geographically dispersed host clouds comprises at least one host cloud operating in a first coordinated universal time (UTC) time zone and a second host cloud operating in a second coordinated universal time (UTC) time zone.

4. The method of claim 3, wherein the predictive workload is predicted for the user account in the second universal coordinated time (UTC) time zone for a time period for the user account.

5. The method of claim 4, wherein the time period for the user account is determined by analyzing the set of usage history data of the user account.

6. The method of claim 5, wherein the set of deployment criteria comprises a least-cost criteria for the user account in view of migration of the predictive workload to the set of host clouds during the time period for the user account.

7. The method of claim 6, wherein the set of subscription parameters comprises a reduced subscription cost in view of execution of the predictive workload in the set of host clouds during the time period for the user account.

8. The method of claim 7, wherein the set of subscription parameters comprises a service level agreement (SLA) to be maintained for host cloud resources in the set of host clouds during the time period for the user account.

9. The method of claim 8, further comprising migrating the workload from the default deployment to the set of host clouds during the time period for the user account in view of the set of subscription parameters.

10. The method of claim 9, further comprising migrating the workload from the set of host clouds to the default deployment after the time period for the user account.

11. The method of claim 4, wherein the time period for the user account comprises a plurality of different predetermined time periods for the user account.

12. The method of claim 1, wherein the set of usage history data comprises at least one of processor usage data, memory usage data, storage usage data, communications bandwidth usage data, operating system usage data, application usage data, service usage data, virtual machine instance data, or appliance usage data.

13. A system comprising:
an interface to a data store, the data store configured to store a set of usage history data associated with a user account operating a workload on a set of virtual machines in a default deployment; and
a hardware processor, configured to communicate with the data store via the interface, the hardware processor configured to:
generate a predictive workload associated with the user account in view of the set of usage history data associated with the user account, wherein the predictive workload reflects an average of a set of resource consumption rates over a first period of time, the set of resource consumption rates determined from the set of usage history data associated with the user account over a set of resources;
responsive to generating the predictive workload, identify a set of available resources in a set of host clouds of virtual machines provided by a cloud provider over the first period of time;
access a set of deployment criteria received from the cloud provider; and
generate a set of subscription parameters in view of the predictive workload, the set of available resources, and the set of deployment criteria to migrate the predictive workload to the set of host clouds of virtual machines.

14. The system of claim 13, wherein the hardware processor is configured to:
dynamically generate the set of subscription parameters, wherein the set of host clouds comprises a set of geographically dispersed host clouds.

15. The system of claim 14, wherein the set of geographically dispersed host clouds comprises at least one host cloud operating in a first coordinated universal time (UTC) time zone and a second host cloud operating in a second coordinated universal time (UTC) time zone.

16. The system of claim 15, wherein the predictive workload is predicted for the user account in the second universal coordinated time (UTC) time zone for a time period for the user account.

17. The system of claim 16, wherein the time period for the user account is determined by analyzing the set of usage history data of the user account.

18. The system of claim 17, wherein the set of deployment criteria comprises a least-cost criteria for the user account in view of migration of the predictive workload to the set of host clouds during the time period for the user account.

19. The system of claim 18, wherein the set of subscription parameters comprises a reduced subscription cost in view of execution of the predictive workload in the set of host clouds during the time period for the user account.

20. The system of claim 19, wherein the hardware processor is further configured to migrate the workload from the default deployment to the set of host clouds during the time period for the user account in view of the set of subscription parameters.

21. The system of claim 20, wherein the hardware processor is further configured to migrate the workload from the set of host clouds to the default deployment after the time period for the user account.

* * * * *